(12) United States Patent
Varrassi et al.

(10) Patent No.: US 11,541,802 B2
(45) Date of Patent: Jan. 3, 2023

(54) VEHICLE FOR DELIVERING INFLAMMABLE FLUID

(71) Applicant: CRYOLOR Societe Anonyme, Arcancy (FR)

(72) Inventors: Lucien Varrassi, Arcancy (FR); Etienne Gibaux, Arcancy (FR)

(73) Assignee: CRYOLOR, Ennery (FR)

(*) Notice: Subject to any disclaimer, the term of this patent is extended or adjusted under 35 U.S.C. 154(b) by 0 days.

(21) Appl. No.: 17/318,305

(22) Filed: May 12, 2021

(65) Prior Publication Data
US 2022/0212591 A1 Jul. 7, 2022

(30) Foreign Application Priority Data
Jan. 4, 2021 (FR) ...................................... 2100014

(51) Int. Cl.
*A62C 2/04* (2006.01)
*B60P 3/22* (2006.01)
*F17C 7/02* (2006.01)

(52) U.S. Cl.
CPC ............ *B60P 3/225* (2013.01); *B60P 3/2245* (2013.01); *B60P 3/2295* (2013.01); *F17C 7/02* (2013.01)

(58) Field of Classification Search
CPC ....... A62C 2/04; B60P 3/2245; F16K 31/043; F16K 31/047; F16L 11/127
USPC .......................................................... 174/47
See application file for complete search history.

(56) References Cited

U.S. PATENT DOCUMENTS

| 5,189,392 A | * | 2/1993 | Kass | F23N 5/245 |
| | | | | 340/532 |
| 5,263,824 A | | 11/1993 | Waldbeser et al. | |
| 5,975,106 A | * | 11/1999 | Morgan | A62C 2/04 |
| | | | | 251/30.01 |

FOREIGN PATENT DOCUMENTS

| FR | 2 156 591 | 6/1973 |
| GB | 2 264 271 | 8/1993 |

OTHER PUBLICATIONS

French Search Report and Written Opinion for FR 2 100 014, dated Sep. 17, 2021.

\* cited by examiner

*Primary Examiner* — Paul J Gray
(74) *Attorney, Agent, or Firm* — Justin K. Murray

(57) ABSTRACT

Vehicle for delivering inflammable fluid comprising a tractor unit and a tank mounted on a support, the vehicle including a fluid circuit connected to the tank that includes a set of pneumatic valves. The vehicle includes an electrical circuit having at least one electrical component and an electricity source connected to the electrical circuit via at least one port for connecting to a connection interface. A cover moves between a first position blocking access to the connection port(s) to prevent the electrical connection between the electricity source and the electrical circuit and a second position not blocking access to the connection port(s) to enable the electrical connection between the electricity source and the electrical circuit. The vehicle includes a switch connected to the fluid circuit switchable between a first state enabling the operation of the set of pneumatic valves to allow filling or draining and a second state preventing the operation of the set of pneumatic valves to prevent filling or draining. In its first position, the movable cover switches the switch or allows it to is be switched to its (Continued)

first state. When the movable cover is in its second position, the switch is automatically switched to its second state.

9 Claims, 2 Drawing Sheets

VEHICLE FOR DELIVERING INFLAMMABLE FLUID

CROSS-REFERENCE TO RELATED APPLICATIONS

This application claims the benefit of priority under 35 U.S.C. § 119 (a) and (b) to French patent application No. FR 2100014, filed Jan. 4, 2021, the entire contents of which are incorporated herein by reference.

BACKGROUND

Field of the Invention

The invention relates to a vehicle for delivering inflammable fluid.

More specifically, the invention relates to a vehicle for delivering inflammable fluid, in particular liquefied fluid such as hydrogen, comprising a tractor unit and a tank mounted on a support towed by the tractor unit, the vehicle comprising a fluid circuit connected to the tank for filling and/or draining fluid, the fluid circuit comprising a set of pneumatic valves, the vehicle further comprising an electrical circuit comprising at least one electrical component of the support towed by the tractor unit, is the vehicle comprising an electricity source detachably connected to the electrical circuit via at least one connection port at a connection interface.

The invention particularly relates to vehicles of the semi-trailer, cryogenic or non-cryogenic type, that transport inflammable gases or liquids such as, for example, hydrogen, natural gas, ethylene, etc.

However, the invention can be applied to any type of explosive environment (ATEX, NFPA or other).

Related Art

When unloading (draining) the semi-trailer into a tank or an installation that is in an explosive atmosphere zone (e.g., those described by ATEX or European Directives 99/92/EC and 94/9/EC), the electricity to the rear road section (lights) needs to be cut-off since this section is not compatible with the ATEX safety requirements.

The electrical connection between the source (tractor vehicle) and the rear of the vehicle generally uses a set of electrical cables and one or more electrical sockets (with 15 or 7 pins, for example).

Thus, when loading or unloading an inflammable liquid or gas into/from a semi-trailer, the loading or unloading environment needs to be made ATEX safe. In other words, on the tractor units or semi-trailers, the electricity for the road section must be neutralized during these operations.

In the known configurations, this safety procedure is basically the responsibility of the operator, which poses risks.

SUMMARY OF THE INVENTION

An aim of the present invention is to overcome all or some of the aforementioned disadvantages of the prior art.

To this end, the vehicle according to the invention, which is also in accordance with the generic definition provided in the above preamble, is basically characterized in that the connection interface comprises a cover that can move between a first position blocking access to the connection port(s) to prevent the electrical connection between the electricity source and the electrical circuit, and a second position not blocking access to the connection port(s) to enable the electrical connection between the electricity source and the electrical circuit, the vehicle further comprising a switch connected to the fluid circuit and switchable between a first state enabling the operation of the set of pneumatic valves of the fluid circuit to allow filling or draining, and a second state preventing the operation of the set of pneumatic valves of the fluid circuit to prevent filling or draining, and in that, in its first position, the movable cover switches the switch or allows it to be switched to its first state, in that when the movable cover is in its second position, the switch is automatically switched to its second state.

Furthermore, embodiments of the invention can comprise one or more of the following features:

the vehicle comprises a return component, such as a spring, urging the switch to its second state;

in its first position, the movable cover exerts a force on the switch, for example, a thrust force, against the force of the return component and places and keeps the switch in its first state;

the switch is of the pneumatic type;

the cover is capable of rotational and/or translational movement between its first and second positions;

in its second state, the switch opens at least part of the fluid circuit to prevent pressurization and the pneumatic control of at least one valve of the fluid circuit;

the tractor unit comprises or forms the electricity source, with this electricity source being connected to the connection interface of the connection port via a set of electrical cables;

the at least one electrical component comprises an indicator light of the vehicle.

The invention can also relate to any alternative device or method comprising any combination of the features mentioned above or below within the scope of the claims.

BRIEF DESCRIPTION OF THE FIGURES

Further features and advantages will become apparent upon reading the following description, which is provided with reference to the figures, in which.

DETAILED DESCRIPTION OF THE INVENTION

Figure 1:
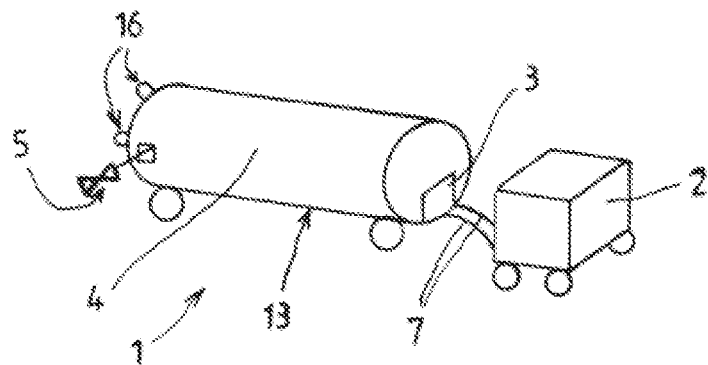
FIG. 1 shows a perspective, schematic and partial view illustrating an example of a vehicle structure according to the invention.

The illustrated vehicle 1 comprises, for example, a tractor unit (lorry) 2 and a tank 4 mounted on a support 13 towed by the tractor unit 2. The support 13 can be, for example, detached from the lorry (coupled trailer).

The vehicle 1 comprises a fluid circuit 5 connected to the tank 4 for filling and/or draining fluid. The fluid circuit 5 conventionally comprises a set of valves 12, 14, preferably pneumatic valves. All or some of the valves are housed, for example, in a control cabinet.

The vehicle 1 further comprises an electrical circuit 6 comprising at least one electrical component 16 of the support 13 towed by the tractor unit 2. The at least one electrical component can particularly comprise rear indicator lights 16 of the vehicle or any other suitable component, for example, an "ABS" type braking control system.

The vehicle 1 comprises an electricity source 2 (battery, for example) detachably connected to the electrical circuit 6 via at least one connection port 9 at a connection interface 3. For example, the tractor unit 2 comprises the electricity source and this electricity source 2 is connected to the rear section via a set of electrical cables 7 that connect at a connection interface 3 comprising connection ports (sockets) 9.

Figure 2:
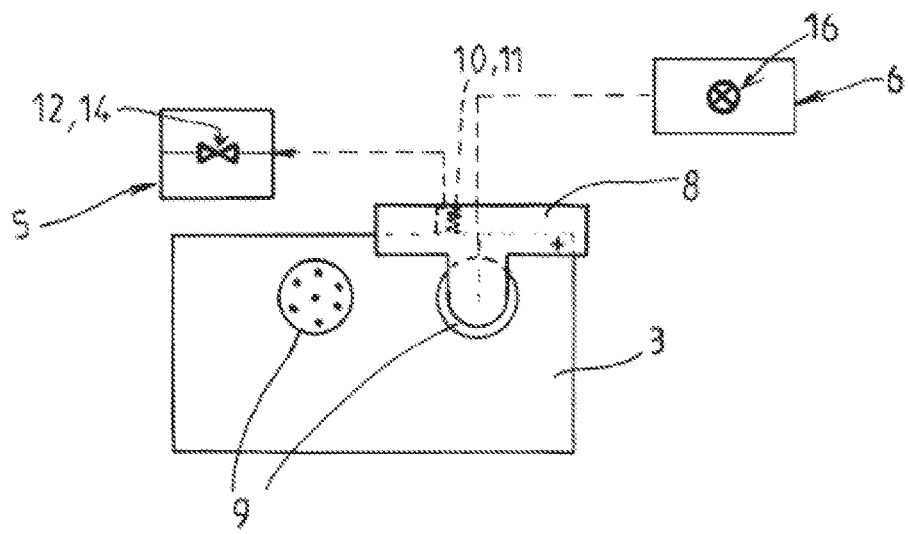
FIG. 2 shows a front, schematic and partial view of a detail of the vehicle illustrating an example of a structure and of the operation of the electrical and fluid circuits of the vehicle in a first operating configuration.
Figure 3:
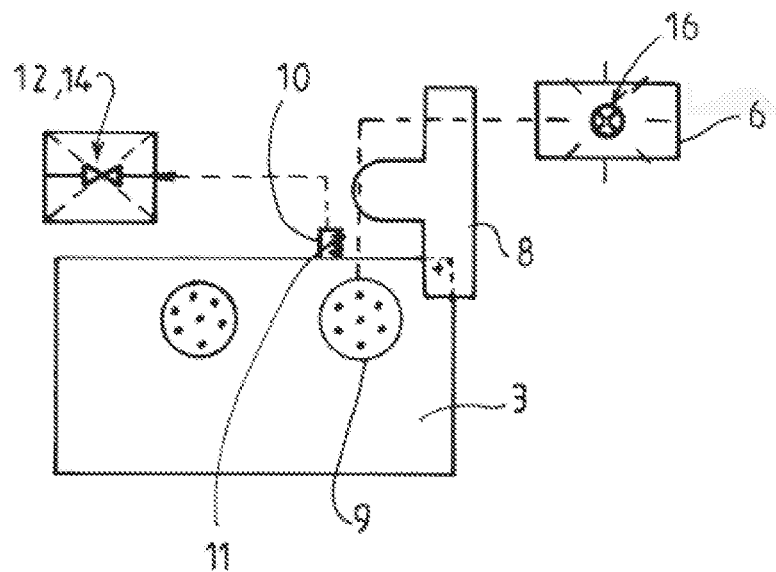
FIG. 3 shows a front, schematic and partial view of a detail of the vehicle illustrating an example of a structure and of the operation of the electrical and fluid circuits of the vehicle in a second operating configuration.
Figure 4:
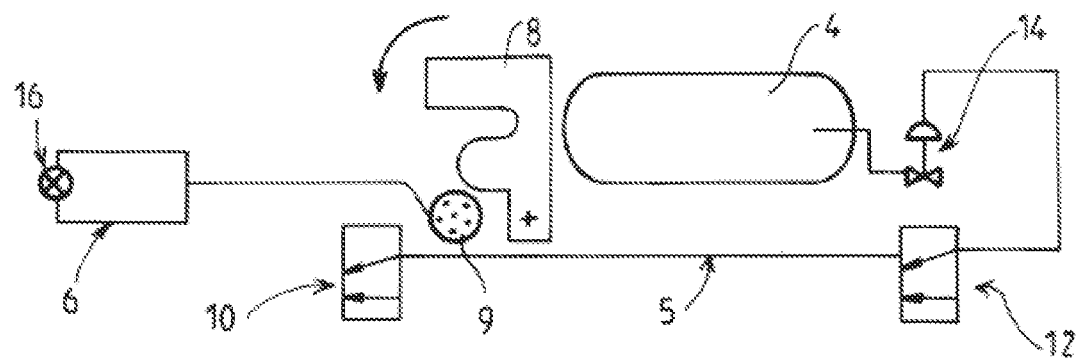
FIG. 4 shows another schematic and partial view of a detail of the vehicle illustrating an example of a structure and of the operation of the electrical and fluid circuits of the vehicle.

According to one advantageous feature, the connection interface 3 comprises a cover 8 (or flap) that can move between a first position blocking access to the connection port(s) 9 to prevent the electrical connection between the electricity source 2 and the electrical circuit 6 (see [FIG. 2]) and a second position not blocking the access to the connection port(s) 9 to enable the electrical connection between the electricity source 2 and the electrical circuit 6 (see [FIG. 3]).

For example, in its first position the cover 8 is placed in front of the one or more sockets 9, whereas in its second position it is placed alongside.

The vehicle 1 further comprises a switch 10 connected to the fluid circuit 5 and switchable between a first state (see [FIG. 2]) enabling the operation of the set of pneumatic valves 12, 14 of the fluid circuit 5 to allow filling or draining, and a second state (see [FIG. 3]) not enabling the operation of the set of pneumatic valves 12, 14 of the fluid circuit 5 for preventing filling or draining.

In its first position, the movable cover 8 switches the switch 10 or allows it to be switched to its first state, and, when the movable switch 8 is in its second position, the switch 10 is automatically switched to its second state.

As illustrated, the cover 8 can be manually rotated. Of course, any other type of movement (translation, etc.) can be provided between its first and second positions.

For example, a return component 11, such as a spring, urges the switch 10 to its second state. In its first position, the movable cover 8 exerts a force on the switch 10, for example, a thrust force (push), against the force of the return component 11 and places and keeps the switch 10 in its first state.

Preferably, the switch 10 is of the pneumatic type.

As schematically shown in [FIG. 3], for example, in its second state, the switch 10 opens at least part of the fluid circuit 5 to prevent pressurization and the pneumatic control of at least one valve 12, 14 of the fluid circuit 5. Filling or draining is prevented by the deactivation of the control valves 12, 14 of the fluid circuit 5.

Thus, in the case of loading and unloading fluid (ATEX atmosphere, i.e. explosive), the operator must move the cover 8, which obstructs the opening of the electrical socket 9 and thus prevents the connection of the electrical circuit via a male plug of the tractor unit 2. The switch 10 acts as a pneumatic sensor and activates the opening of the pneumatic unloading or loading valves 12, 14 that are located at the rear of the vehicle 1.

This enables fluid to be transferred in complete safety (no powering-on of the electrical circuit 6).

To return to the road, the electrical socket 9 must be connected in order to electrically power the electrical circuit of the vehicle 1.

The switch 10 is then deactivated and the pneumatic valves 10, 12 are closed and deactivated, guaranteeing the absence of hydrogen.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A vehicle for delivering inflammable fluid, comprising a tractor unit and a tank mounted on a support towed by the tractor unit, the vehicle comprising a fluid circuit connected to the tank for filling and/or draining fluid, the fluid circuit comprising a set of pneumatic valves, the vehicle further comprising an electrical circuit comprising at least one electrical component of the support towed by the tractor unit, the vehicle comprising an electricity source detachably connected to the electrical circuit via at least one port for connecting to a connection interface, wherein:

the connection interface comprises a movable cover that can move between a first position blocking access to the connection port(s) to prevent the electrical connection between the electricity source and the electrical circuit and a second position not blocking access to the connection port(s) to enable the electrical connection between the electricity source and the electrical circuit;

the vehicle further comprises a switch connected to the fluid circuit and switchable between a first state enabling the operation of the set of pneumatic valves to allow filling or draining, and a second state preventing the operation of the set of pneumatic valves to prevent filling or draining;

when the movable cover is in the first position thereof, the movable cover switches the switch or allows the switch to be switched to the first state thereof;

when the movable cover is in the second position thereof, the switch is automatically switched to the second state thereof.

2. The vehicle of claim 1, further comprising a spring that urges the switch to its second state.

3. The vehicle of claim 2, wherein when the movable cover is in the first position, the movable cover exerts a thrust force on the switch against the force of the spring and places and keeps the switch in the first state thereof.

4. The vehicle of claim 1, wherein the switch is a pneumatic switch.

5. The vehicle of claim 1, wherein the movable cover is capable of rotational and/or translational movement between the first and second positions thereof.

6. The vehicle of claim 1, wherein, in the second state, the switch opens at least part of the fluid circuit to prevent pressurization and the pneumatic control of at least one valve of the fluid circuit.

7. The vehicle of claim 1, wherein the tractor unit comprises or forms the electricity source and in that this electricity source is connected to the connection interface of the connection port via a set of electrical cables.

8. The vehicle of claim 1, wherein the at least one electrical component comprises an indicator light of the vehicle.

9. The vehicle of claim 1, wherein the inflammable fluid is liquefied hydrogen.

* * * * *